United States Patent [19]
Leimbach et al.

[11] Patent Number: 5,148,684
[45] Date of Patent: Sep. 22, 1992

[54] INJECTION VALVE FOR A REFRIGERATION SYSTEM

[75] Inventors: J. George Leimbach, Crestwood; Joseph H. Heffner, Chesterfield, both of Mo.

[73] Assignee: Sporlan Valve Company, St. Louis, Mo.

[21] Appl. No.: 684,304

[22] Filed: Apr. 12, 1991

[51] Int. Cl.⁵ .................................. F25B 5/00
[52] U.S. Cl. .................. 62/197; 236/99 R; 62/505
[58] Field of Search ............... 62/197, 117, DIG. 17, 62/505; 236/92 B, 99 R

[56] References Cited

U.S. PATENT DOCUMENTS

| | | | |
|---|---|---|---|
| 853,541 | 5/1907 | Eddy | 236/99 R |
| 1,885,711 | 11/1932 | Giesler | 236/99 R |
| 1,920,458 | 8/1933 | Bast | 236/99 R |
| 2,719,674 | 10/1955 | Carter | 236/99 R |
| 3,242,688 | 3/1966 | Miller | 62/217 |
| 3,338,518 | 8/1967 | Barbier | 236/86 |
| 3,452,929 | 7/1969 | Douglas | 236/80 |
| 3,795,117 | 3/1974 | Moody, Jr. et al. | 62/197 |
| 3,859,815 | 1/1975 | Kasahara | 62/197 |
| 4,095,742 | 6/1978 | Schumacher | 236/92 B |

Primary Examiner—William E. Wayner
Attorney, Agent, or Firm—Cohn, Powell & Hind

[57] ABSTRACT

This control valve (10) can be used for reducing the temperature of the discharge gas in the compressor (100) of a refrigeration system. The valve (10) includes a body (12) having inlet and outlet ports (20, 22), respectively receiving refrigerant from one part of the system and injecting it to a point upstream of compressor discharge, a valve seat (32), disposed between said inlet and outlet ports, and a valve member (34) controlling flow through the valve seat. The valve (10) includes a spring assembly (40) mounted in the body (12) and applying a force to the valve member (34) tending to urge the valve member into a closed position and an actuator assembly (50) modulating the valve member (34) in response to a change of temperature in the compressor discharge line. The actuator assembly (50) includes an actuator (52) movable within the body (12), a connector (70) attached to the body, a bellows (60) connected between the actuator (52) and the connector (70). A temperature responsive sensor (108) communicates with the bellows (60) to control pressure in the bellows and pushrods (70) interconnect the actuator (52) and the valve member (34) to modulate the valve member in response to temperature change in the sensor (108).

7 Claims, 2 Drawing Sheets

INJECTION VALVE FOR A REFRIGERATION SYSTEM

BACKGROUND OF THE INVENTION

This invention relates to control valves and particularly to a valve for controlling refrigerant temperature at the compression stage of a refrigeration system.

For environmental reasons the refrigerant currently used with refrigeration systems is being changed to R-22 for low and medium temperature applications. This requires little or no change in equipment for medium temperature applications but in low temperature applications the compression ratio of a single stage compressor causes high discharge temperatures.

One solution to the problem is to provide two stage compression but this tends simply to change the location of the problem to the high stage compressor. Another solution is to apply a conventional expansion valve, set at a relatively high superheat setting, to the suction inlet of the compressor which injects liquid into the suction inlet which reduces the superheat of the compressor discharge gas. This method, in effect, measures and controls one parameter (suction temperature) to control another parameter (discharge temperature).

Another method of controlling the temperature of the discharge gas is to measure its temperature at the compressor head by determining the temperature of the discharge gas by means of a temperature sensor, reading the temperature with a solid state control and injecting liquid through a small solenoid valve into the head of the compressor. This approach is expensive and requires drilling inlet holes in the head of the compressor.

The present invention utilizes a liquid injection approach but without the need for direct modification of the compressor.

SUMMARY OF THE INVENTION

This valve provides method of controlling the temperature of the discharge gas of the compressor by injecting liquid gas into the compressor suction line, the valve being controlled by sensing the temperature of the discharge gas.

This injection valve utilizes a control assembly which includes bellows in conjunction with a capillary tube and bulb assembly. Unlike a conventional expansion valve which is responsive to bulb temperature on one side of the diaphragm and a change in pressure on the other side of the diaphragm (or bellows), this valve is responsive only to the temperature of the bulb. The pressure on the other side of the bellows has no effect on the point at which the valve opens so that the valve is a truly temperature sensitive valve responding directly to the sensed temperature of the compressor discharge gas.

This control valve includes a body including an inlet port receiving refrigerant from one part of the system, an outlet port injecting refrigerant into the system at a point upstream of compressor discharge, a valve seat disposed between said inlet and outlet ports and a valve member movable relative to said valve seat to vary flow through said valve seat between said inlet and outlet ports; means mounted in the body and applying a force to said valve member tending to urge said valve member into a closed position; means mounted in the body and applying a modulating force to said valve member including a connector attached to the body, an actuator movable within the body, a bellows connected between said actuator and said connector, a temperature responsive means communicating with the bellows to control pressure in the bellows, and means operatively interconnecting the actuator and the valve member to modulate the valve member in response to temperature change of the temperature responsive means.

It is an aspect of the invention to provide that the connector is received within the bellows to substantially reduce the effective volume of the bellows and to provide that the temperature responsive means is a bulb sensor having a volume substantially in excess of the effective volume of the bellows.

It is another aspect of the invention to provide that the bellows includes a relatively large number of convolutions and has a relatively small stroke to increase the valve life cycle of the valve.

Yet another aspect of the invention is to provide that the actuator includes a recess receiving the bellows therewithin in close clearance relation.

It is an aspect of the invention to provide that the valve outlet port communicates with the compressor suction line, and another aspect to provide that the temperature responsive means is a bulb sensor located in temperature responsive relation to the compressor discharge line.

Still another aspect of the invention is to provide that the actuator is movably mounted in an actuator chamber and an equalizer passage operatively connects the actuator chamber to the outlet port to equalize pressure between the actuator and said outlet port.

In another aspect of the invention the body includes a stop means, and the actuator, at the point of valve opening, is spaced from the stop means a predetermined amount to provide an override means to prevent damage to the bellows from over pressurization when the temperature responsive means is exposed to excessive temperature.

It is an important aspect of the invention to provide a control valve which is relatively easy and inexpensive to manufacture and operates effectively for its purpose.

DESCRIPTION OF THE PREFERRED EMBODIMENT

Figure 1:
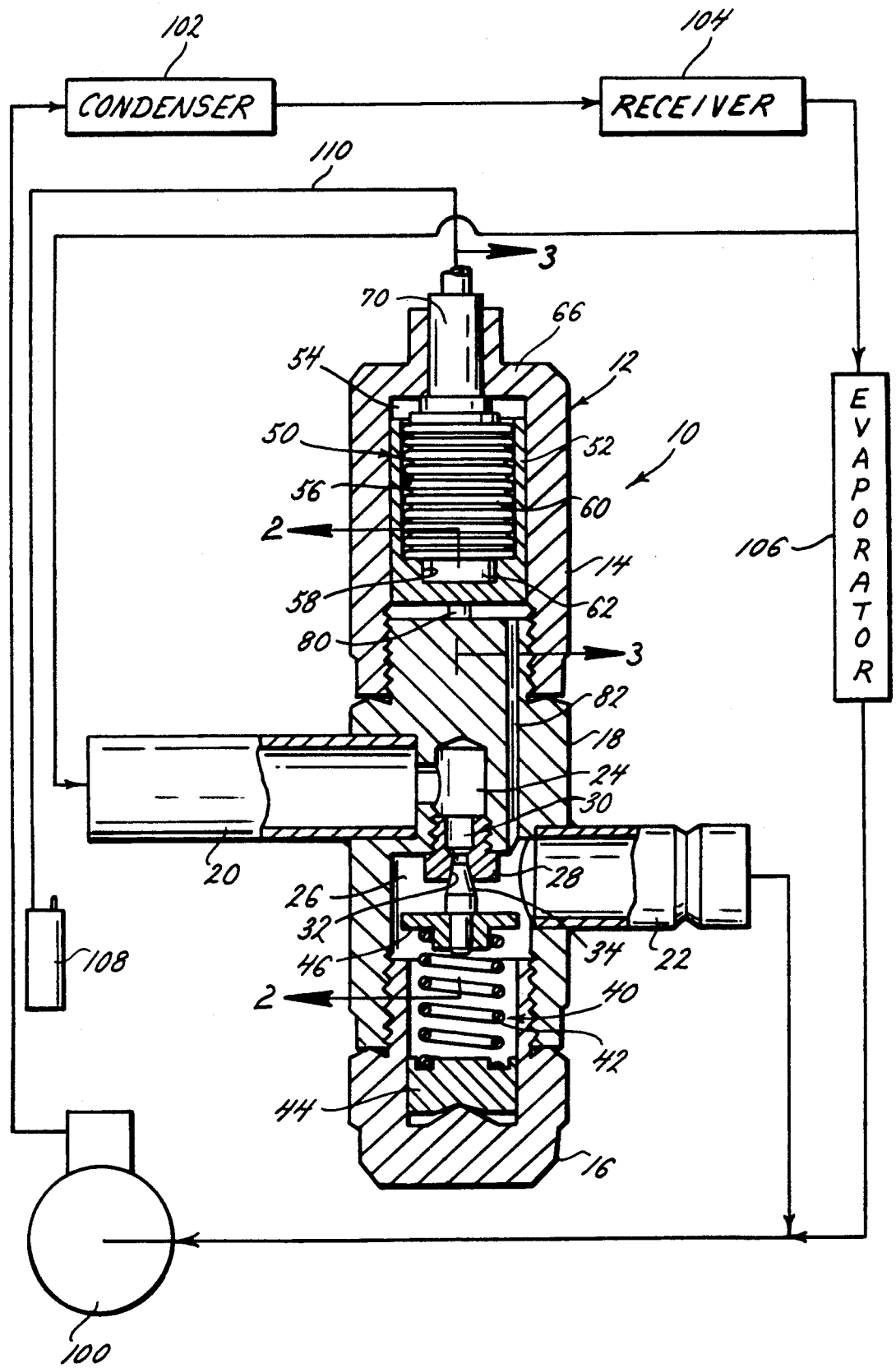
FIG. 1 is a longitudinal cross sectional view of the valve as used in a refrigeration system.

Referring now by reference numerals to the drawings and first to FIG. 1 it will be understood that the control valve 10 is shown as used in a conventional refrigeration system consisting of a compressor 100, a condenser 102, a receiver 104 and an evaporator 106. In the embodiment shown, the control valve 10 receives fluid from the refrigeration system before the evaporator state and injects fluid into the compressor suction line. Flow through the valve 10 is controlled by a bulb sensor 108 which is responsive to temperation change in the compressor discharge line. The control valve 10 will now be described with particularity with reference to FIGS. 1—3.

The valve 10 includes body 12 having an upper portion 14, a lower portion 16 and an intermediate portion 18. The intermediate body portion 18 includes an inlet fitting 20 providing an inlet port, and an outlet fitting 22 providing an outlet port. The inlet fitting 20 communicates at one end with the refrigeration system line adjacent the evaporator inlet and at the other end with an inlet chamber 24 within the intermediate body portion 18. The outlet fitting 22 communicates at one end with the compressor suction line and at the other end with an outlet chamber 26 separated from the inlet chamber 24 by a threaded adaptor 28 having a passage 30 providing a valve port and seat communicating between the inlet and outlet ports provided by the inlet and outlet fittings 20 and 22 respectively.

The lower end of the passage 30 is tapered to provide a valve seat 32 to receive a tapered pin 34 providing a valve member which is movable relative to the valve seat 32 to control fluid flow through the valve port. The lower body portion 16, which is threadedly connected to the intermediate body portion 18, is recessed to receive a compression spring assembly 40 consisting of a compression spring 42, a spring guide 44 and a pin carrier 46. The pin carrier is apertured to receive the reduced diameter lower end of the valve pin 34 and the compression spring 42 provides an upward force tending to urge the valve member 34 into a closed position. A countervailing force tending to urge the valve pin 34 into an open position is provided by an actuator assembly 50 located in the upper body portion 12.

Figure 3:
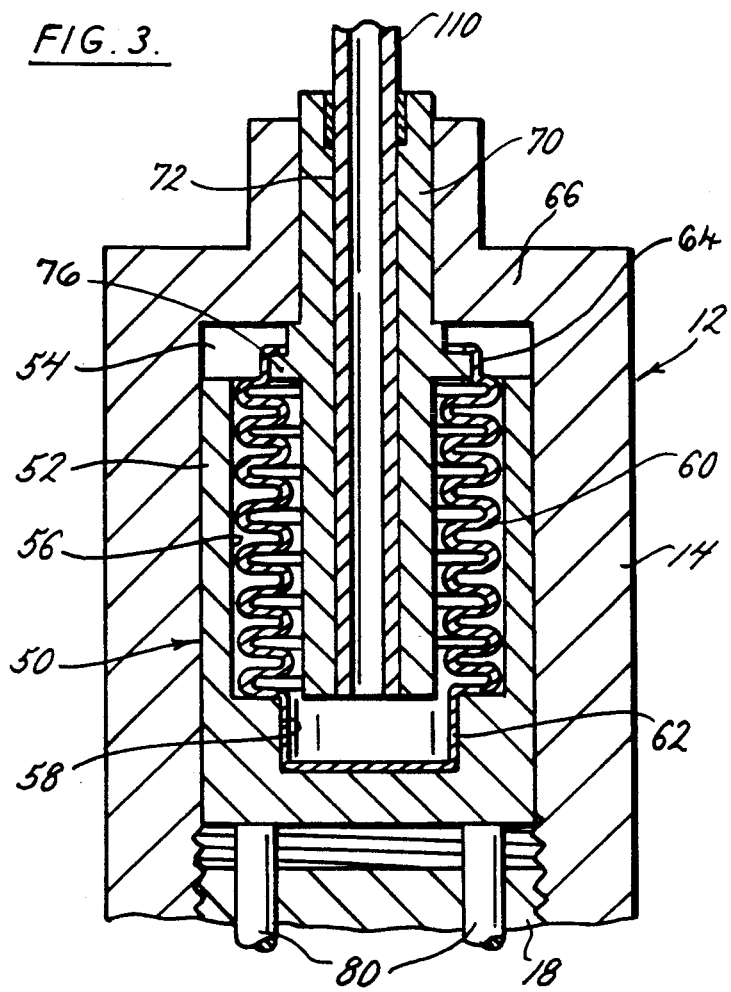
FIG. 3 is a sectional view taken on line 3—3 of FIG. 1 showing the value in a closed position.

The upper body portion 14 is threadedly connected to the intermediate body portion 18 and provides a housing for the actuator assembly 50. As best shown in FIG. 3, the actuator assembly 50 includes a cylindrical actuator member 52 slidably mounted for movement within a cylindrical chamber 54 formed within the body portion 12. The actuator member 52 includes a recess 56 having a reduced diameter lower portion 58 sized to receive the lower end 62 of a bellows 60. A connector member 70 is attached to the endwall 66 of the upper portion 12 and is coaxially received within the actuator member recess 56. The connector member 70 includes a central passage 72 which receives a conduit 74 communicating with the temperature bulb sensor 108, as shown in FIG. 1. The connector member 70 includes an annular flange 76 which provides a connection for the upper end 64 of the bellows 60. The connector member 70 is sized to provide a filler block within the bellows 60 and thereby reduces the available volume within said bellows.

Figure 2:
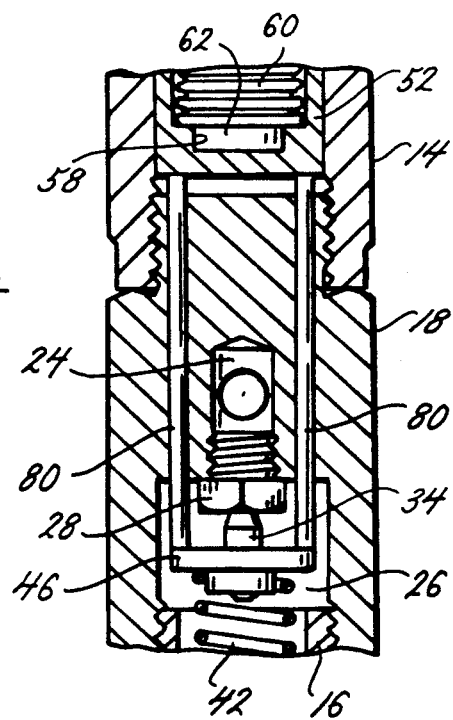
FIG. 2 is an enlarged fragmentary cross sectional view taken on line 2—2 of FIG. 1.

As is best shown by reference to FIGS. 2 and 3, axial movement of the actuator member 52 is transmitted to the valve pin 34 by means of a pair of pushrods 80 slidably received within passages provided in the intermediate body portion 18. In the embodiment shown the upper ends of the pushrods 80 engage the underside of the adaptor member 52 and the lower end of said pushrods engage the upper surface of the pin carrier 46. In this manner movement of the actuator member 52 is directly transmitted to the valve pin 34. As shown in FIG. 1, the actuator chamber 54 and the outlet chamber 26 are interconnected by an equalizer passage 82 extending through the intermediate body portion 18 equalizing the pressure at these two locations. Accordingly, movement of the valve pin 34 is directly responsive to a change of temperature at the location of the bulb sensor 108.

It is thought that the structural features and functional advantages of the valve have become clear from the foregoing description of parts. However, for completeness of disclosure the operation of the valve and particular features will be briefly described.

The bulb 108, capillary tube 110 and bellows 60 are filled with a liquid such as Xylene which has a high coefficient of expansion and the bulb 108 is attached directly to the discharge line as shown or, alternatively, it can be inserted into the head of the compressor 100.

As the temperature of the bulb approaches the set point of the valve, liquid refrigerant is injected into the suction inlet of the compressor 100 or alternatively, directly into the suction cavity on the head of the compression. Because of the structural arrangement of valve parts and the provision of the equalizing passage the pressure on the lower side of the actuator member 52, and hence on the bellows 60 has no effect on the point at which the valve open so that the valve is a truly temperature responsive valve.

In order to minimize the effect of ambient temperature on the opening point of the valve 10, the relationship between the volume of the bellows 60 and the bulb 108 is important. In the preferred embodiment shown the ratio of the volume of the bulb to the volume of the bellows is ten to one (10:1). This results in a minimum shift in opening point which is 1° F. change in opening point per each 10° F. change in the valve ambient. In order to reduce the volume of the bellows 60, which has a free length of approximately 0.6 inches over convolutions, an approximate O.D. of 0.475 inches and I.D. of 0.312 inches, a filler block is provided in the form of the connector member 70 having a diameter received within the bellows of 0.265 inches which reduces the bellows volume substantially. The I.D. of the actuator recess is 0.50 inches.

The like of the bellows 60 is considerably increased by using a large number of convolutions with a small bellows stroke. This results in a high life cycle rate. In the embodiment shown the bellows 60 has fifteen convolutions or about twenty-five convolutions per inch. Fewer convolutions are shown in the drawings as a matter of illustrative convenience.

In the embodiment shown, the rated capacity of the valve is at 0.016 inches of stroke. This rating point will occur with a 5° F. change in bulb temperature and it is possible for the bulb temperature increase to be considerably higher than this. For example, a temperature increase of 50° F. above opening point might be experienced during shipping and an override mechanism is desirable.

The valve 10 is provided with a simple override means to prevent damage to the bellows 60 from overpressurization in the event that the valve bulb 108 is exposed to excessive temperature. In the embodiment shown, the override means is provided by the simple expedient of spacing the actuator member 52 from the upper face 19 of the body portion 18, which constitutes a stop means, a predetermined distance, which is approximately 0.05 inches to build additional stroke into the valve, it being understood that the spring 42 must have a coil spacing to ensure that the spring does not go solid. Thus, if the bulb temperature exceeds 5° F. the valve will continue to stroke open allowing the bellows 60 to expand and not exceed its maximum pressure. It will be understood that if the maximum internal pressure is exceeded, the bellows will be damaged causing premature failure or rupture and the provision of the override guards against this.

Although the improved control valve has been described by making particular reference to a preferred injection valve, the details of description are not to be understood as restrictive, numerous variants being possible within the principles disclosed and within the fair scope of the claims hereunto appended.

We claim as our invention:

1. A control valve for controlling temperature of compressor discharge in a refrigeration system including an evaporator, a compressor and a condenser, the valve comprising:
   (a) a body including an inlet port receiving refrigerant from one part of the system, an outlet port injecting refrigerant into the system at a point upstream of compressor discharge, a valve seat disposed between said inlet and outlet ports and a valve member movable relative to said valve seat to vary flow through said valve seat between said inlet and outlet ports,
   (b) means mounted in the body and applying a force to said valve member tending to urge said valve member into a closed position, and
   (c) means applying a modulating force to said valve member including a connector attached to the body, an actuator movable within the body, a bellows connected between said actuator and said connector, a temperature responsive means and means communicating with the bellows and means operatively interconnecting the actuator and the valve member said temperature responsive means, said communicating means and said bellows being filled with a liquid having an expansion coefficient sufficient to modulate the valve member in response to cubical expansion of the liquid due to temperature change of the temperature responsive means,
   (d) the connector including an upper portion attached to the body upper portion and a lower portion received within the bellows to substantially reduce the effective volume of the bellows.

2. A control valve as defined in claim 1, in which:
   (e) the temperature responsive means is a bulb sensor having a volume substantially in excess of the effective volume of the bellows.

3. A control valve for controlling temperature of compressor discharge in a refrigeration system including an evaporator, a compressor and a condenser, the valve comprising:
   (a) a body including an inlet port receiving refrigerant from one part of the system, an outlet port injecting refrigerant into the system at a point upstream of compressor discharge, a valve seat disposed between said inlet and outlet ports and a valve member movable relative to said valve seat to vary flow through said valve seat between said inlet and outlet ports,
   (b) means mounted in the body and applying a force to said valve member tending to urge said valve member into a closed position, and
   (c) means applying a modulating force to said valve member including a connector attached to the body, an actuator movable within the body, a bellows connected between said actuator and said connector, a temperature responsive means and means communicating with the bellows and means operatively interconnecting the actuator and the valve member said temperature responsive means, said communicating means and said bellows being filled with liquid having an expansion coefficient sufficient to modulate the valve member in response to cubical expansion of the liquid due to temperature change of the temperature responsive means,
   (d) the actuator including a recess receiving the bellow therewithin in close clearance relation.

4. A control valve for controlling temperature of compressor discharge in a refrigeration system including an evaporator, a compressor and a condenser, the valve comprising:
   (a) a body including an inlet port receiving refrigerant from one part of the system, an outlet port injecting refrigerant into the system at a point upstream of compressor discharge, a valve seat disposed between said inlet and outlet ports and a valve member movable relative to said valve seat to vary flow through said valve seat between said inlet and outlet ports,
   (b) means mounted in the body and applying a force to said valve member tending to urge said valve member into a closed position, and
   (c) means applying a modulating force to said valve member including a connector attached to the body, an actuator movable within the body, a bellows connected between said actuator and said connector, a temperature responsive means and means communicating with the bellows and means operatively interconnecting the actuator and the valve member said temperature responsive means, said communicating means and said bellows being filled with a liquid having an expansion coefficient sufficient to modulate the valve member in response to cubical expansion of the liquid due to temperature change of the temperature responsive means,
   (d) the actuator including a recess,
   (e) the connector having a lower portion received in coaxial relation within said recess, and
   (f) the bellows having an outside diameter substantially equal to the diameter of the actuator recess, and an inside diameter substantially equal to the diameter of the connector received within said bellows.

5. A control valve for controlling temperature of compressor discharge in a refrigeration system including an evaporator, a compressor and a condenser, the valve comprising:
   (a) a body including an inlet port receiving refrigerant from one part of the system, an outlet port injecting refrigerant into the system at a point upstream of compressor discharge, a valve seat disposed between said inlet and outlet ports and a valve member movable relative to said valve seat to vary flow through said valve seat between said inlet and outlet ports,
   (b) means applying a force to said valve member tending to urge said valve member into a closed position, and
   (c) means applying a modulating force to said valve member including a connector attached to the body, an actuator movable within the body, a bellows connected between said actuator and said connector, a temperature responsive means and means communicating with the bellows to control pressure in the bellows, and means operatively interconnecting the actuator and the valve member said temperature responsive means, said communicating means and said bellows being filled with a liquid having an expansion coefficient sufficient to modulate the valve member in response to cubical expansion of the liquid due to temperature change of the temperature responsive means, (d) the valve outlet port communicating with the compressor suction line between the compressor and the evaporator.

6. A control valve for controlling temperature of compressor discharge in a refrigeration system including an evaporator, a compressor and a condenser, the valve comprising:

(a) a body including an inlet port receiving refrigerant from one part of the system, an outlet port injecting refrigerant into the system at a point upstream of compressor discharge, a valve seat disposed between said inlet and outlet ports and a valve member movable relative to said valve seat to vary flow through said valve seat between said inlet and outlet ports, (b) means mounted in the body and applying a force to said valve member tending to urge said valve member into a closed position, and (c) means applying a modulating force to said valve member including a connector attached to the body, an actuator movable within the body, a bellows connected between said actuator and said connector, a temperature responsive means and means communicating with the bellows and means operatively interconnecting the actuator and the valve member said temperature responsive means, said communicating means and said bellows being filled with a liquid having an expansion coefficient sufficient to modulate the valve member in response to cubical expansion of the liquid due to temperature change of the temperature responsive means, (d) the temperature responsive means being a bulb sensor located in temperature responsive relation to the compressor discharge line.

7. A control valve for controlling temperature of compressor discharge in a refrigeration system including an evaporator, a compressor and a condenser, the valve comprising:

(a) a body including an inlet port receiving refrigerant from one part of the system, an outlet port injecting refrigerant into the system at a point upstream of compressor discharge, a valve seat disposed between said inlet and outlet ports and a valve member movable relative to said valve seat to vary flow through said valve seat between said inlet and outlet ports, (b) means mounted in the body and applying a force to said valve member tending to urge said valve member into a closed position, and (c) means applying a modulating force to said valve member including a connector attached to the body, an actuator movable within the body, a bellows connected between said actuator and said connector, a temperature responsive means and means communicating with the bellows and means operatively interconnecting the actuator and the valve member said temperature responsive means, said communicating means and said bellows being filled with a liquid having an expansion coefficient sufficient to modulate the valve member in response to cubical expansion of the liquid due to temperature change of the temperature responsive means, (d) the body including a stop means, and (e) the actuator at the point of valve opening being spaced from the stop means a predetermined amount to build additional stroke into the valve member to provide an override means to prevent damage to the bellows from over pressurization when the temperature responsive means is exposed to excessive temperature.

* * * * *